May 12, 1925.                                                    1,537,095
E. A. THOMPSON
APPARATUS FOR WITHDRAWING AND RECLAIMING THE LIQUID CONTENTS
OF THE CRANK CASE OF AN INTERNAL COMBUSTION ENGINE
Original Filed June 20, 1921    2 Sheets-Sheet 1
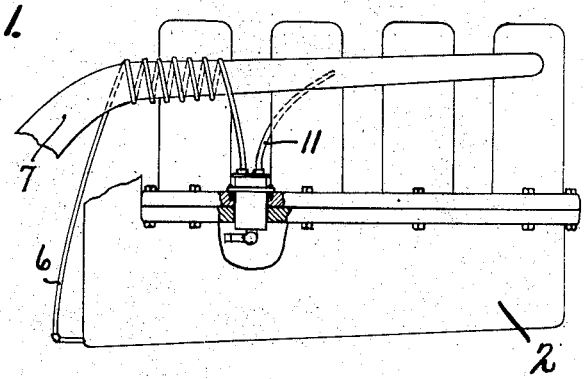
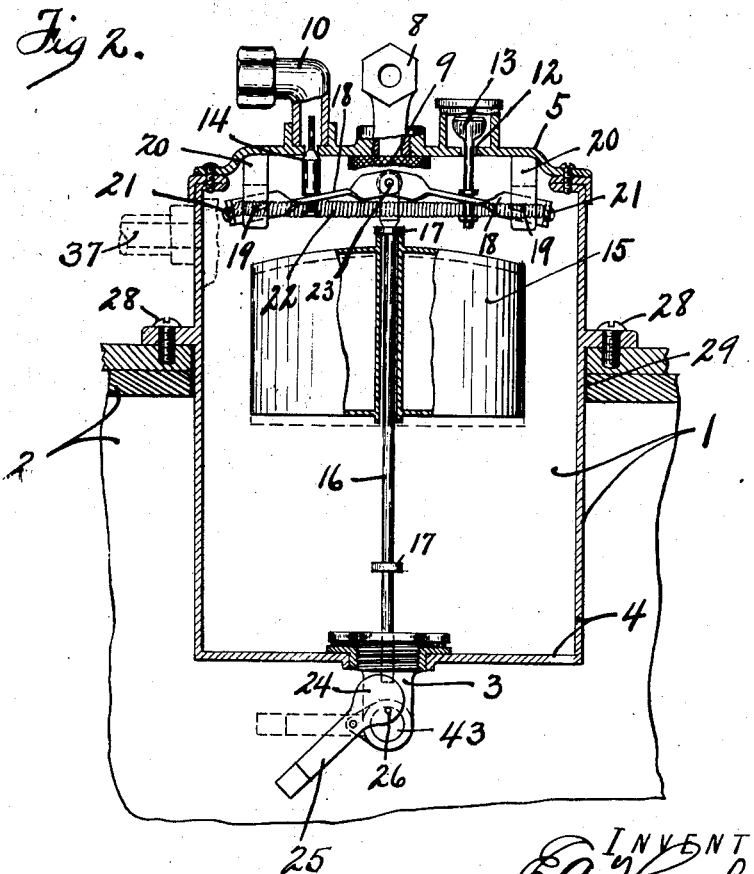

May 12, 1925.  1,537,095

E. A. THOMPSON
APPARATUS FOR WITHDRAWING AND RECLAIMING THE LIQUID CONTENTS
OF THE CRANK CASE OF AN INTERNAL COMBUSTION ENGINE
Original Filed June 20, 1921  2 Sheets-Sheet 2

Patented May 12, 1925.

1,537,095

UNITED STATES PATENT OFFICE.

EUGENE A. THOMPSON, OF SYRACUSE, NEW YORK.

APPARATUS FOR WITHDRAWING AND RECLAIMING THE LIQUID CONTENTS OF THE CRANK CASE OF AN INTERNAL-COMBUSTION ENGINE.

Application filed June 20, 1921, Serial No. 479,157. Renewed March 18, 1925.

*To all whom it may concern:*

Be it known that I, EUGENE A. THOMPSON, of Syracuse, in the county of Onondaga, in the State of New York, have invented new and useful Improvements in Apparatus for Withdrawing and Reclaiming the Liquid Contents of the Crank Case of an Internal-Combustion Engine, of which the following, taken in connection with the accompanying drawings, is a full, clear, and exact description.

This invention relates to certain improvements in apparatus for withdrawing and reclaiming the liquid contents of the crank case of an internal combustion engine.

The main object of the invention is to provide an improved device for filtering and cleansing the oil in the crank case of an internal combustion engine and for separating said oil from foreign liquids such as gasoline and water that may have become mixed with the oil, and which vaporize at lower temperatures than the oil.

My invention takes form in a structure that in itself becomes substantially a rigid portion of the crank case and operates automatically to withdraw the oil and foreign material from the crank case, separating the oil from sediment and such liquids as gasoline, kerosene and water, and to return the purified and reclaimed oil directly to the crank case, the vaporized liquid being supplied to the internal combustion engine as fuel.

Other objects and advantages of this invention relate to the details of construction and operation of the device, as will more fully appear from the following description, taken in connection with the accompanying drawings, in which:—

Figure 1 is an elevation of an engine with an apparatus of my invention applied thereto.

Figure 2 is a vertical section through the apparatus and the crank case holder.

Figure 3:
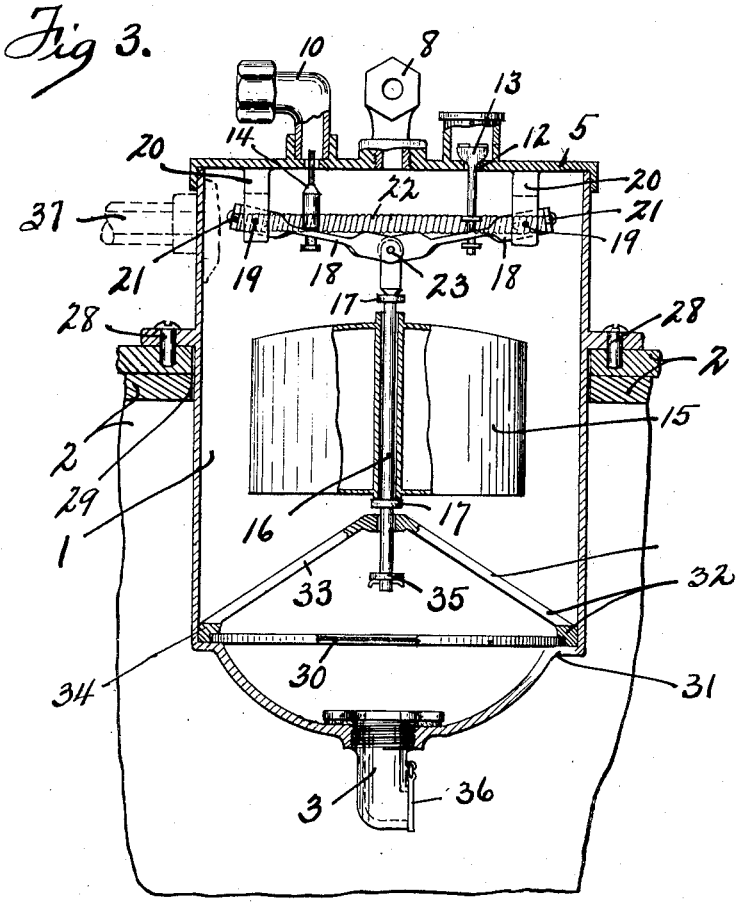
Figure 3 is a view similar to Figure 2 of a somewhat modified form of structure.

The invention, as illustrated in the drawings, comprises an internal combustion engine of any type, embodying a crank-case —2—, which is adapted to contain oil for lubricating parts of the engine. For the purpose of withdrawing such lubricant from the crank case and separating the same from sediment and foreign liquids and substances in a new and novel manner, I have provided a structure shown in section in Figures 2 and 3. In Figure 2 this structure consists of a tank —1— comprising a cylindrical cup-shaped portion —4—, and a cover or cap —5— secured to the upper end thereof and closing the said tank except for the connections hereinafter named.

In order to effect the elevation of lubricant, or contents of the crank case to the tank —1—, a pipe —6— is provided preferably connected to the lower portion of the crank case and provided at an intermediate part with a heating means of a character suitable for heating the lubricant to a temperature such that when subjected to the vacuum existing in the tank, as hereinafter described, vaporization of the foreign liquids will take place. As illustrative of a suitable heating means, I have shown the pipe —6— coiled about the exhaust pipe —7— of the engine and then connected to a nipple —8— that penetrates the cap —5—. Within the tank —1— and surrounding the inlet from the nipple —8— is a screen —9— which may be of any suitable size for screening the foreign substances, such as metal parts, etc. from the lubricant, before the same is discharged into the tank —1—. The tank —1— is also connected to a suitable source of suction by the suction nipple —10— and pipe —11— communicating preferably with the inlet manifold of the engine, as indicated in dotted lines in Figure 1. The cover —5— is further provided with an atmospheric vent —12— controlled by an upwardly opening valve —13—, while the suction connection —10— is controlled by a downwardly opening valve —14—. These valves —13— and —14— may be operated by any suitable mechanism so that when the tank is connected with the source of suction, it is most of the period of time, isolated from communication with the atmosphere, and when the tank is in communication with the atmosphere it is for practically the entire period of time cut off from the suction line.

For the purpose of operating these valves reversely, I have shown a float —15— mounted upon float stem —16— so that the float may slide, or move relatively to the stem within limits determined by the abutments —17— formed in connection with the float stem. The upper end of the float stem has a pair of similarly formed levers —18— pivoted thereto so that movement of the stem —17— causes similar movement of the said levers about their pivots —19— upon the lugs —20—, extending downwardly from the cover —5—. Preferably these pivots —19— are formed by means of pivots or pins mounted in the lugs —20— and extending through elongated slots into respective levers —18—. The valve —14— is slidably mounted on one of the levers —18— so as to move upwardly to closed position, while the valve —13— is also slidably mounted on the other lever —18— and moves downwardly to closed position. The outer ends of the levers —18— are bifurcated to form two arms which are bent to extend in opposite directions, such arms —21— connected by a pair of springs —22— so as to snap the levers into reverse positions, as the pivot —22— moves above or below the line connecting the pivot pins —19— as the former is actuated by the float —15—. This specific construction forms no portion of my invention, but is merely illustrative of a particular snap-over mechanism operable for my purpose.

The lower end of the tank is provided with an outlet nipple —3— which may have a threaded connection with the body of the tank —1— and is provided at its lower end with a lateral opening —43— controlled by a slide valve —24— which is normally held in open position by counter-weighted arm —25—. For the purpose of mechanically closing this valve when it is desired to produce vacuum in the chamber —3—, the float stem —16— is in alignment with a pin —26— extending from the inner side of valve —24— into the nipple —3— so that as the float moves the stem —16— downwardly the stem contacts with this projection —26— and moves the valve —24— to closed position.

The very essence of my invention consists in the particular assemblage of this elevating and withdrawing tank and its connection with the crank case of the engine. The tank —1— penetrates the crank case so that the connections —8—, —10— and —12— are exterior of the crank case, while the discharge opening —43— is within the crank case. Any suitable arrangement may be provided for effecting this result and as shown, the body —4— is provided with an outwardly extending flange which contacts with the crank case and may be secured thereto as by screws —28— when the body —4— is extended through an opening —29— in the crank case. The operation of this structure is that when the float is in its downward position, as illustrated in Figure 3, the vacuum produced in the chamber by the communication through nipple —10— with the manifold of the engine causes the contents of the crankcase to be elevated through pipe —6— and discharged into the tank —1— through the screen —9—.

The screen separates the solid foreign material from the lubricant and other liquids and as the liquid has been heated to a proper temperature during its passage through pipe —6— when it comes into the vacuum chamber —3—, the gasoline, kerosene and water are immediately vaporized at the low pressure existing therein, and the vapor passes through the nipple —10— into the manifold of the engine, while the reclaimed oil settles into the bottom of the chamber —3— and proceeds to gradually fill the same, thereby elevating the float —15— until the float raises the rod —16— to actuate the levers —18— to thereby close the suction valve —14— and open the air valve —13—. At that point atmospheric pressure is produced in the chamber —3— and valve —24— opens by reason of the counterweight —25— and the reclaimed oil is discharged directly back to the crank case.

In Figure 3 the lower portion of the tank is of slightly different form and instead of forming or positioning a screen about the inlet —8— for the liquid contents of the crankcase, a screen —30— is provided, which extends across the lower portion of the tank —3— and seats upon the flange —31— of said tank and is carried by and secured to a spider —32— which may have any desired number of arms, as for instance, two, indicated at —33— and a ring —34— which surrounds the edge of the screen. The lower end of the float stem —16— extends through this spider —32—, the spider being of somewhat conical form and the float stem is provided with an enlarged portion, or washer, —35— by means of which the spider —32— and screen —31— may be withdrawn from the tank —3— by removing the cover —5— and lifting the same to remove the float and valve-operating mechanism, as well as the screen and spider, to permit cleaning or repair of the parts.

In this construction shown in Figure 3, the nipple —27— is in like manner formed with a lateral opening, and in this case is provided with a normally closed flap valve —36— that is opened by gravity flow of the liquid. The seat of the valve is somewhat slightly inclined from the horizontal so that the valve by gravity moves into contact with its seat in a manner well known.

Figure 4:
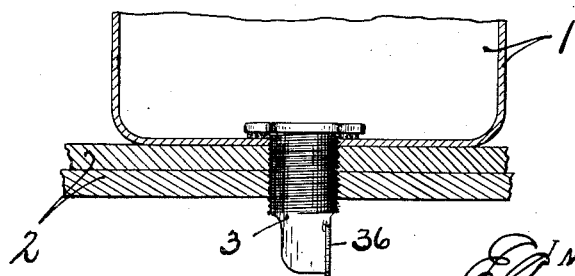
Figure 4 is a further view of a modified form of structure illustrating a somewhat different method of assembling the withdrawing apparatus in connection with the crank case.

In Figure 4 a similar valve to that shown in Figure 3 is illustrated, but instead of the entire tank being inserted through a portion of the crank case, the nipple —27— is externally threaded and is screwed into an internally threaded opening in the crank case. This permits of a considerably smaller opening being made in the crank case, and of ready assemblage and separation of parts, the essential feature being that the air exhaust and the oil inlet connections, as well as the atmospheric inlet, be exterior of the crank case while the discharge nipple, or the discharge opening from said nipple shall be within the crank case so as to discharge the oil directly back into the case.

As shown by dotted lines Figs. 2 and 3, the inlet —8— may be omitted and an inlet —37— provided which enters the tank tangentially to the inner surface, thereby causing the liquid to spread on and move spirally in a layer upon the inner surface of the tank so as not to interfere with the float and the valve actuating mechanism and to effect a perhaps more complete vaporization of the foreign liquid constituents due to its layer form.

Although I have illustrated particular constructions as constituting perhaps preferred embodiments of my invention, it will be understood that the mechanism for operating the valves, as well as the form and shape of the parts and their relative arrangement may be changed and modified in various ways without departing from the invention as set forth in the appended claims.

What I claim is:

1. The combination with an engine and its crankcase having an opening therethrough, of a chambered device having a part extending through the opening of the crankcase, a conduit exterior of the crankcase and connecting the crankcase to the chamber of said device, means for heating liquid flowing through said conduit, means for connecting said chamber to a source of suction, a discharge from said chamber directly into the crankcase and a valve within the crankcase controlling such discharge.

2. The combination with an engine and its crankcase, of a chambered device, a conduit exterior of the crankcase and connecting the crankcase to the chamber of said device, means for connecting said chamber to a source of suction, a discharge from said chamber into the crankcase and a valve within the crankcase controlling such discharge.

3. The combination with an engine and its crankcase, of a tank device, a conduit exterior of the crankcase and connecting the crankcase to said tank, an exhaust connection and an air inlet for said tank, both positioned exterior to the crankcase, and a valved discharge opening from said tank disposed within the crankcase.

4. In a device of the class described, the combination with an engine and its crankcase, of a chambered device penetrating the crankcase, a liquid inlet connection and an air exhaust connection to said chambered device, valves for controlling said connection, a valve discharge opening from said chambered device disposed within the crankcase, and float-actuated means for positively closing said valve.

5. In an oil feeding device, a tank structure, means for connecting said tank structure to the crankcase of an internal combustion engine, means for heating the liquid mixture flowing from said crankcase to said tank structure, means for exhausting air from said tank structure, said tank structure having a discharge opening, a normally open slide valve controlling said discharge opening and float actuated means for positively closing said valve.

6. The combination with an engine and its crank case, of a tank device, a conduit exterior of the crank case and connecting the crank case to said tank device for supplying liquid from the crank case to said device, means for heating the liquid supplied from said crank case to said tank device, an air exhaust connection and an air inlet for said tank, and a valve discharge opening from said tank disposed within the crank case.

7. The combination with an engine and its crank case of a tank device, a conduit exterior of the crank case and connecting the crank case to said tank device for supplying liquid from the crank case to said device, means for heating the liquid supplied from said crank case to said tank device an air exhaust connection and an air inlet for said tank, a valve discharge opening from said tank disposed within the crank case, and means for filtering the liquid during its passage from the crank case back to the crank case.

8. The combination with an engine and its crank case, of a chambered device, a conduit exterior of the crank case and connecting the crank-case to the chamber of said device, means for connecting said chamber to a source of suction, a discharge from said chamber into the crank case, a valve within the crank case controlling such discharge, and means for filtering liquid drawn from the crank case through said conduit and returned to the crank case through said discharge.

In witness whereof I have hereunto set my hand.

EUGENE A. THOMPSON.

Witnesses:
H. E. CHASE,
E. M. FRADENBURGH.